Sept. 21, 1943.    D. M. SMITH    2,329,950
PISTON PACKING
Filed Jan. 6, 1940
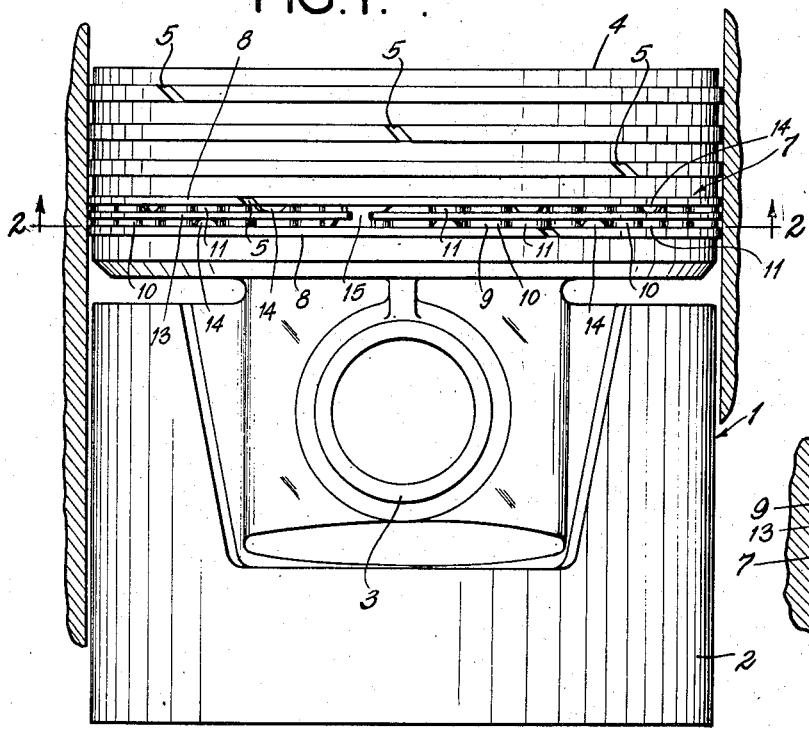
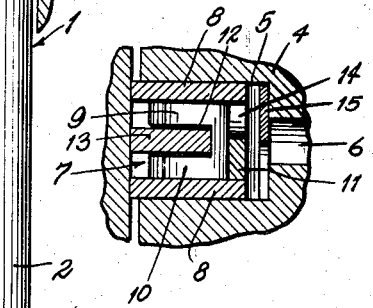
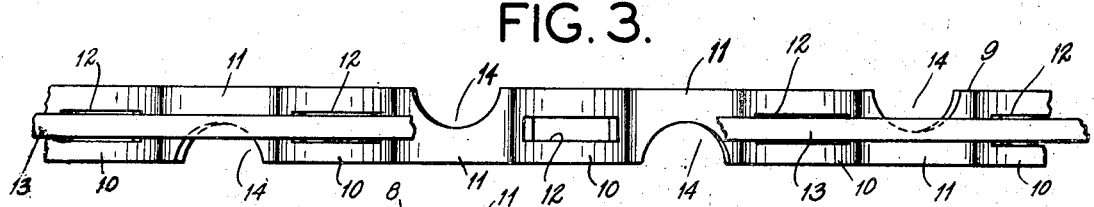
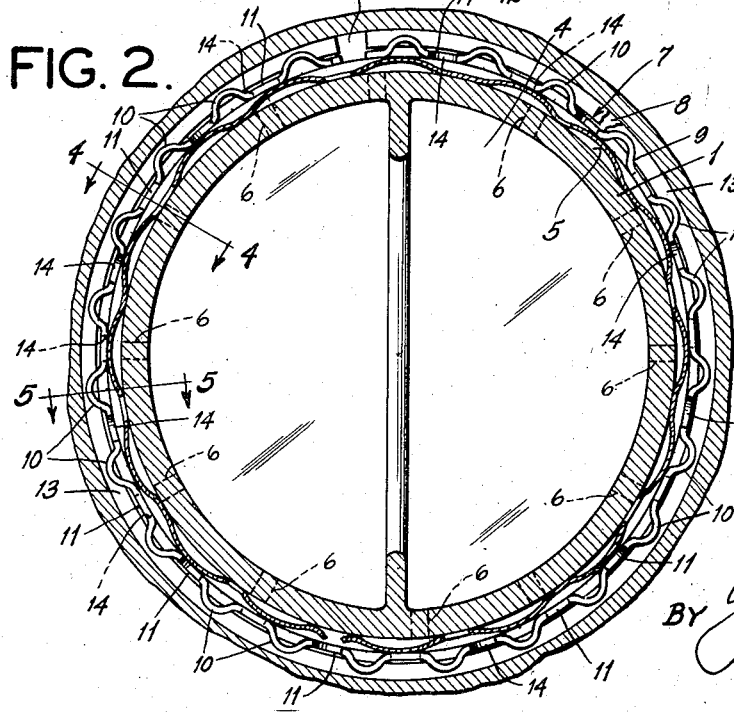
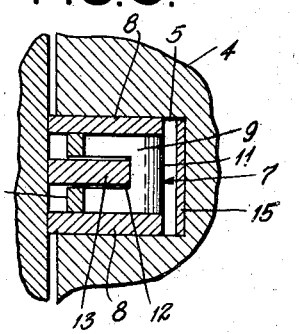
INVENTOR:
DALLAS M. SMITH
BY J Henry Kneely
ATTORNEY.

Patented Sept. 21, 1943

2,329,950

UNITED STATES PATENT OFFICE 2,329,950

PISTON PACKING

Dallas M. Smith, Kirkwood, Mo., assignor to McQuay-Norris Manufacturing Company, St. Louis, Mo., a corporation of Delaware Application January 6, 1940, Serial No. 312,762

9 Claims. (Cl. 309—45)

My invention relates to multiple-piece piston packings and more particularly to multiple-piece packings adapted to provide an effective seal between the piston and the cylinder in which the piston reciprocates.

My invention contemplates a piston packing adapted for use in a ring groove of a piston and comprising a separator formed of a substantially thin strip bent flatwise into flexuous form whereby the overall thickness of the strip after formation is substantially greater than the thickness of the material of which the separator is made. The flexures of the separator may be formed any desired shape but preferably are formed of U-shaped portions with slightly curved connecting portions therebetween. The overall shape of the separator is substantially circular and the strip is slit between the ends thereof so that the separator may expand and contract radially to follow irregularities in the cylinder wall. The separator preferably has an inherent resiliency tending to expand the separator radially toward the cylinder wall and the U-shaped portions of the separator have slots formed therein and arranged circumferentially of the separator to receive a thin expansible ring member. When the separator is used in an oil control packing, the connecting portions between the U-shaped portions have oil passages formed therein so that oil scraped from the cylinder wall by the ring member may flow freely therethrough. The separator preferably is used with one or more thin steel expansible ring members which are positioned adjacent the sides of the ring groove and adjacent the separator so that, when more than one ring member is used, the separator spaces the ring members from each other.

Having thus briefly described my invention, one object thereof is to produce a multiple-piece piston packing which may be used as an oil control ring.

A more specific object of my invention is to provide a piston packing which will provide an effective seal between the piston and the cylinder in which the piston reciprocates.

Other objects and advantages will be apparent to those skilled in the art from the following description wherein reference is made to the drawing illustrating a preferred embodiment of my invention and wherein like reference numerals designate like parts throughout the several views.

In the drawing,

Fig. 1 is a side view of a piston provided with a packing constructed according to my invention.

Fig. 2 is a section on the line 2—2 of Fig. 1.

Fig. 3 is a detailed view of a separator constructed according to my invention.

Fig. 4 is a vertical section on the line 4—4 of Fig. 2, and

Fig. 5 is a vertical section on the line 5—5 of Fig. 2.

Referring to the figures, a piston 1 is shown therein and comprises a skirt 2, wrist pin bosses 3 and a head 4 having formed therein the usual ring grooves 5 with oil vents 6 leading from the bottom of the lowermost groove to the interior of the piston. Located in the lowermost ring groove 5 of the piston 1 is a packing 7 constructed according to my invention. It should be understood that the piston 1 with which the packing is used may be of any kind and constitutes no part of my invention. The piston is shown herein for illustrative purposes only.

The packing 7 comprises a pair of thin expansible ring members 8 formed of flexible material, preferably steel, and positioned in the lowermost ring groove 5 of the piston 1 adjacent the side walls thereof. A separator 9 is positioned in the ring groove 5 between the ring members 8 and spaces the ring members from each other. The separator 9 in the embodiment shown, comprises a substantially thin strip of flexible material, preferably steel, bent and arranged at intervals into U-shaped portions 10, with slightly curved connecting portions 11 therebetween. The strip is bent also so that the overall shape thereof is substantially circular with the U-shaped portions 10 extending outwardly of the separator toward the cylinder wall and defining the circumference of the separator. The separator has a slit between the ends thereof and an inherent resiliency tending to expand the separator radially outwardly toward the cylinder wall so that the separator may expand and contract to follow irregularities therein. The U-shaped portions 10 have formed therein slots 12 arranged circumferentially of the separator to receive a ring member 13 formed preferably of steel and adapted to fit snugly in the slots 12 of the separator 9 so that the ring member 13 expands and contracts radially with the separator. The ring member 13 preferably is substantially thinner radially than the depth of the ring groove 5 and the overall thickness of the ring member 13 and the separator 9 is slightly less than the radial thickness of the ring members 8, for the reasons mentioned hereinafter.

When the packing is used as an oil control ring, the connecting portions 11 between the U-shaped portions 10 have oil passages 14 formed therein so that oil scraped from the cylinder wall may flow freely through the packing 7 and vents 6 into the interior of the piston 1. The passages 14 preferably are arranged in staggered relation, that is, the passages are located alternately above and below the ring member 13, as shown clearly in Fig. 3, to strengthen the separator.

The packing may include also, an expander 15 positioned between the bottom of the ring groove 5 and the rear faces of the ring members 8 and adapted to exert radial force on the members 8 so that the members in turn exert high unit force on the cylinder wall. Since the ring members 8, as described above, preferably are slightly thicker radially than the overall radial width of the ring member 13 and separator 9, the expander 15 engages only the ring members 8, and the separator 9 and ring member 13 expand and contract independently of the ring members 8 and expander 15.

From the above description, it will be apparent that a packing constructed according to my invention may be used as an oil control ring and will provide an effective seal between the piston and the cylinder in which the piston reciprocates.

Other arrangements may be used without deviating from the scope of my invention and while I have described a particular embodiment thereof, it is to be understood that I do not limit myself to the form and arrangement shown and described. For instance, in some instances, it may be desirable to use the ring member 13 and separator 9 without the ring members 8 or, it may be found expedient to utilize the packing as shown in the drawing without an expander 15 to exert radial force on the ring members 8.

What I claim as new and desire to secure by Letters Patent, is:

1. A separator for a multiple-piece piston packing comprising a substantially thin strip of spring material bent flatwise into flexuous form whereby the overall thickness of said strip after formation is substantially greater than the thickness of the material of which said separator is made, the overall shape of said separator being substantially circular and said strip having a slit between the ends thereof so that said separator may expand and contract to follow irregularities in the cylinder wall, said separator having an inherent resiliency tending to expand said separator radially toward the cylinder wall, and the circumferential flexures of said separator having slots formed therein and arranged in alignment circumferentially of said separator, and a ring member positioned in said slots and adapted to engage the cylinder wall.

2. A separator for a multiple-piece piston packing comprising a substantially thin strip of flexible material formed and arranged at intervals into U-shaped portions with connecting portions therebetween, the overall shape of said separator being substantially circular and said strip having a slit between the ends thereof so that said separator may expand and contract to follow irregularities in the cylinder wall, each of said U-shaped portions of said strip having slots formed therein at the vertex thereof and arranged in alignment circumferentially of said separator, an expansible ring member positioned in said slots and adapted to engage the cylinder wall, and said separator having an inherent resiliency tending to expand said separator and said ring member radially toward the cylinder wall.

3. A separator for a multiple-piece piston packing comprising a substantially thin strip of flexible material formed and arranged into U-shaped portions with connecting portions therebetween, the overall shape of said separator being substantially circular and said strip having a slit between the ends thereof so that said separator may expand and contract to follow irregularities in the cylinder wall, each of said U-shaped portions of said strip having slots formed therein at the vertex thereof and arranged in alignment circumferentially of said separator, an expansible ring member positioned in said slots and adapted to engage the cylinder wall, and said connecting portions between said U-shaped portions having oil passages formed therein so that oil scraped from the cylinder wall by said member may flow freely therethrough.

4. A separator for a multiple-piece piston packing comprising a substantially thin steel strip bent and arranged at intervals into U-shaped portions with connecting portions therebetween, said strip being bent also so that the overall shape thereof is substantially circular with the U-shaped portions extending outwardly of said separator toward the cylinder wall and defining the circumference thereof, and said strip having a slit between the ends thereof so that said separator may expand and contract to follow irregularities in the cylinder wall, each of said U-shaped portions of said strip having slots formed therein at the vertex thereof in alignment circumferentially of said separator, an expansible ring member positioned in said slots and adapted to engage the cylinder wall, said connecting portions between said U-shaped portions having oil passages formed therein so that oil scraped from the cylinder wall by said ring member may flow freely therethrough, and said separator having an inherent resiliency tending to expand said separator and said ring member radially toward the cylinder wall.

5. A piston packing comprising a pair of thin expansible ring members adapted to engage a cylinder wall, a separator positioned and arranged between said members and adapted to space said members from each other, said separator comprising a substantially thin strip of spring material bent flatwise into flexuous form whereby the overall thickness of said strip after formation is substantially greater than the thickness of the material of which said separator is formed, the overall shape of said separator being substantially circular and said strip having a slit providing a clearance between the ends thereof so that said separator may expand and contract radially to follow irregularities in the cylinder wall, said separator having an inherent resiliency tending to expand said separator radially toward the cylinder wall, the circumferential flexures of said separator having slots formed therein and arranged in alignment circumferentially of said separator, and a ring member adapted to engage the cylinder wall and supported in the slots of said separator and adapted to expand and contract radially with said separator.

6. A piston packing comprising a pair of thin expansible ring members adapted to engage a cylinder wall, a separator positioned and arranged between said members and adapted to space said members from each other, said separator comprising a substantially thin strip of spring material bent flatwise into flexuous form whereby the overall thickness of said strip after formation is substantially greater than the thickness of the material of which said separator is formed, the overall shape of said separator being substantially circular and said strip having a slit between the ends thereof so that said separator may expand and contract radially to follow irregularities in the cylinder wall, said separator having an inherent resiliency tending to expand said separator radially toward the cylinder wall, the circumferential flexures of said separator having slots formed therein and arranged in alignment circumferentially of said separator, a ring member adapted to engage the cylinder wall and supported in the slots of said separator and adapted to expand and contract radially with said separator, and an expander positioned between the bottom of the ring groove and said expansible members and adapted to engage the rear faces of said members and exert force thereon so that said members in turn exert a high unit force on the cylinder wall.

7. A piston packing comprising a pair of thin expansible ring members adapted to engage a cylinder wall, a separator positioned and arranged between said members and adapted to separate said members from each other, said separator comprising a substantially thin strip of spring material bent and arranged flatwise into flexous form whereby the overall thickness of said strip after formation is substantially greater than the thickness of the material of which said separator is formed, the overall shape of said separator being substantially circular and said strip having a slit between the ends thereof so that said separator may expand and contract radially to follow irregularities in the cylinder wall, said separator having an inherent resiliency tending to expand said separator radially toward the cylinder wall, the circumferential flexures of said separator having slots formed therein and arranged in alignment circumferentially of said separator, a ring member adapted to engage the cylinder wall and supported in the slots of said separator and adapted to expand and contract radially therewith, the overall radial thickness of said separator and said member supported thereby being slightly less than the radial thickness of said members separated thereby, an expander positioned between the bottom of the ring groove and said expansible members and adapted to engage the rear faces of said members only and exert force thereon so that said members in turn exert a high unit force on the cylinder wall.

8. A piston packing comprising a pair of thin expansible ring members adapted to engage a cylinder wall, an expansible separator positioned and arranged between said members and adapted to separate said members from each other, said separator comprising a substantially thin steel strip having U-shaped portions formed therein at intervals with connecting portions therebetween, the overall shape of said separator being substantially circular in form, said U-shaped portions of said strip having slots formed therein and arranged in alignment circumferentially of said separator, a thin steel ring member positioned in said slots in said U-shaped portions of said separator and adapted to engage the cylinder wall, said member fitting snugly in said slots in said U-shaped portions whereby said member expands and contracts with said separator, said separator having oil passages formed and arranged therein in said connecting portions between said U-shaped portions, and an expander positioned between the bottom of the ring groove and said expansible members and adapted to engage the rear faces of said members and exert force thereon so that said members in turn exert a high unit force on said cylinder wall.

9. A separator for a multiple-piece piston packing comprising a substantially thin strip of spring material bent flatwise in flexuous annular ring form whereby the overall thickness of said annular ring after formation is substantially greater in radial and axial direction than the thickness of the material of which said separator is made, said strip having a slit providing a clearance between the ends thereof so that said separator may expand and contract to follow irregularities in the cylinder wall, said separator having an inherent resiliency tending to expand said separator radially toward the cylinder wall, and the circumferential flexures of said separator having slots formed therein and arranged in alignment circumferentially of said separator, and a ring member positioned in said slots and adapted to engage the cylinder wall.

DALLAS M. SMITH.